J. GODDARD.
LIGHT TRAP.
APPLICATION FILED MAY 9, 1910.
985,581.
Patented Feb. 28, 1911.
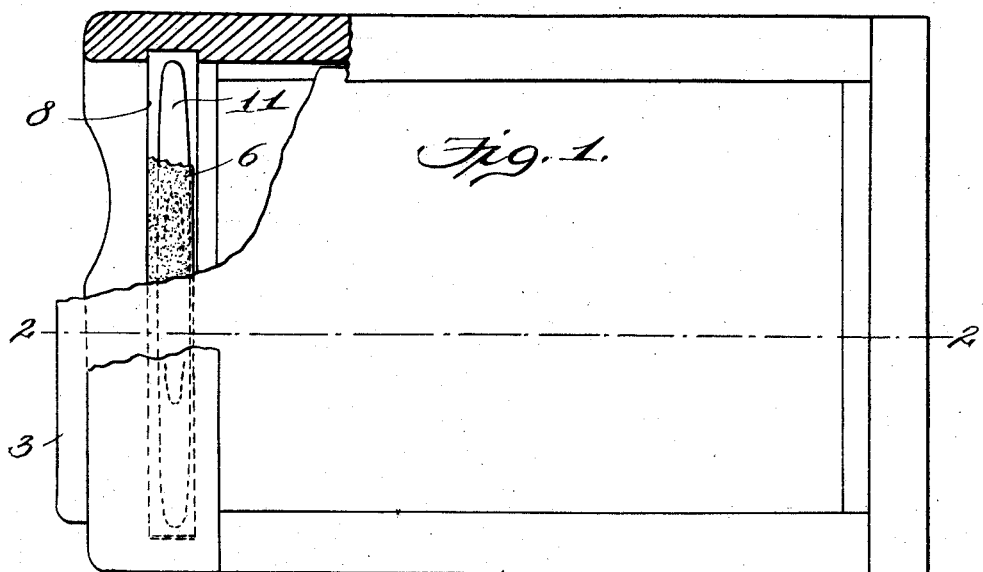
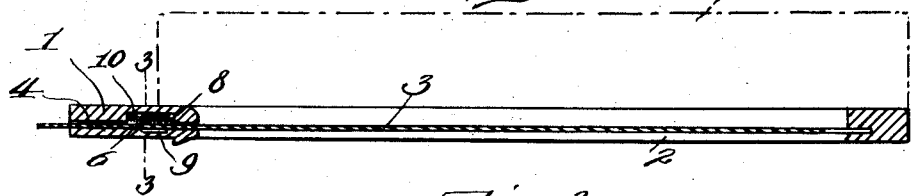
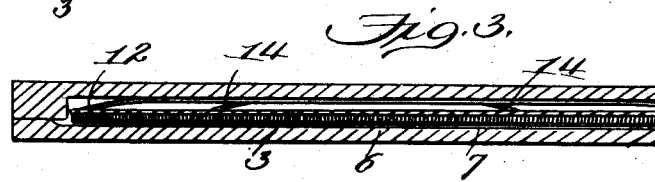
Witnesses:
Inventor
Joseph Goddard

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

LIGHT-TRAP.

985,581.  Specification of Letters Patent.  Patented Feb. 28, 1911.

Application filed May 9, 1910. Serial No. 560,106.

*To all whom it may concern:*

Be it known that I, JOSEPH GODDARD, a citizen of the United States, residing at Rochester, in the county of Monroe and State of New York, have invented new and useful Improvements in Light-Traps, of which the following is a specification.

My present invention relates to improvements in light traps for the exposure-controlling slides of photographic plate holders, film pack adapters, and other receptacles for sensitized materials, and it has for its object to provide a simple and improved light trap of this class which is very thin and in operation is capable of perfectly excluding light from the interior of the holder, even should the exposure-controlling slide be inserted cornerwise, the extreme thinness of the light trap not only enabling it to be accommodated in a relatively small space, but the device is pressed into position in such a manner that light cannot pass it at any point in its length, either during or after the insertion and removal of the slide.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents the front of a holder for sensitized material, a portion thereof being broken away to illustrate the location of the light trap with respect to such a holder; Fig. 2 represents a section on the line 2—2 of Fig. 1, a receptacle being shown in dotted position for receiving a film pack; Fig. 3 represents a section on the line 3—3 of Fig. 2; and Figs. 4 and 5 are perspective views of the elements of the light trap detached and removed from the holder, Fig. 5 showing the spring as provided with three intermediate tongues instead of two, as in the preceding figures.

Similar parts are designated by the same reference characters in the several views.

My present invention provides a light trap which is capable of use in connection with plate or film holders of various kinds, although it is especially adapted for use in connection with film pack adapters wherein a single exposure-controlling slide is usually employed, and the space available for the light trap is limited.

In the accompanying drawing, I have shown the light trap as applied to a conventional form of film pack adapter. It will be understood, however, that the invention is not necessarily limited in this respect and, moreover, it will be understood that certain modifications and changes may be made in the detail construction or relative arrangement of the parts in order that the invention may be applied to the best advantage in each particular case.

In the present instance, 1 designates a frame which may form the front of the holder or adapter, and in the present instance, this frame is adapted to fit the back of a camera. The frame has an exposure opening 2 and an opaque slide 3 which when inserted closes the exposure opening. This slide operates in a slot 4 formed in the frame. In the present instance, I have shown in dotted lines a chamber 5 to contain the sensitized material in the form of a film pack or otherwise.

The light trap embodying my present invention is inserted in the frame and coöperates with the exposure-controlling slide. This light trap consists of a strip of material 6 which is capable of obtaining a light-tight engagement with the slide while the latter is in position or with the opposed wall of the slide-receiving slot when the slide is removed. I prefer to use a strip of felt or plush which is of a length slightly greater than the width of the exposure-controlling slide. In order to render this strip 6 of felt or plush sufficiently stiff to cause it to be pressed uniformly throughout its length against the exposure-controlling slide without, however, requiring the use of a separate metal backing plate as heretofore used, I apply a coating of sizing 7 to the rear side of the strip, the sizing permitting the strip 6 to be easily flexed so that it may adapt itself perfectly to the conditions existing during or after the insertion and removal of the exposure-controlling slide. This light-excluding strip is contained in a transverse recess 8 formed in the frame 1 at one side of the slide-receiving slot 4. The opposite wall of the slide-receiving slot is preferably provided with an opposed transverse recess 9 into which a portion of the light excluding strip may extend when the slide is removed, thereby insuring a perfectly tight closure for the slide-receiving slot.

The stiffened but flexible strip 6 is suitably secured in the recess 8 so as to prevent its displacement, its outer edge being attached to the frame at 10 by a suitable adhesive which holds the outer edge of the strip in such a position as to prevent the exposure-controlling slide from catching upon the strip while the slide is being inserted, and the inner edge of the strip is free to swing about the glued edge of the strip after the manner of a hinge.

The present invention also provides an improved spring for effectively pressing the light-excluding strip against the slide when the same is in position or against the opposed wall of the slide-receiving slot when the slide is removed. This spring is composed of a single length of flat resilient material 11, spring steel being suitable, and the material is comparatively thin in order to insure a high degree of resilience. This spring lies in the recess 8 behind the light excluding strip, the two ends of the spring 12 and 13 being bent laterally and bearing upon the sized backing 7 of the light excluding strip at or in immediate proximity to the extreme ends of the strip, and a suitable number of intermediate tongues 14 are formed upon the spring and bear directly upon the backing 7 of the light excluding strip at suitable intervals intermediate the length of the strip. These tongues 14 are preferably struck from the body portion of the spring and are of such a length as to insure the requisite resilience, and by forming these supplemental or intermediate tongues within the body of the spring or within its longitudinal edges, the spring is not materially weakened nor is it liable to break.

The action of the ends of the spring supplemented by the intermediate tongues causes substantially uniform pressure to be exerted upon the light excluding strip so that practically every part of this strip throughout its length may yield independently and insure a positive cutting off of the light. The semi-rigid backing 7 which is applied to the rear face of the light excluding strip stiffens the strip to a degree just sufficient to transmit the pressure from the spring to those portions of the strip removed from the points which are engaged directly by the spring.

By using a light excluding strip which is provided with a semi-rigid backing and using in connection with such a strip, a spring of the form above described, a light trap is produced which is capable of operating perfectly to exclude light from the holder at all times and irrespective of the manner in which the exposure-controlling slide is inserted and removed and, moreover, a light trap is provided which is very thin, this being an advantage which enables the light trap to be applied to film pack adapters and to other photographic accessories wherein the space available for the light trap is very limited.

I claim as my invention:

1. In a holder for sensitized photographic materials, the combination of a frame, an exposure-controlling slide movable therein, and a light trap contained in the frame and comprising a strip of relatively soft flexible material having a coating of stiffening substance applied directly to its rear side and incorporated therewith, thereby uniting said strip and coating as a single part, and a spring having portions bearing against the stiffening coating on said strip at intervals in the length of the strip and pressing the latter uniformly against the exposure-controlling slide.

2. In a holder for sensitized photographic materials, the combination of a frame provided with a recess, an exposure-controlling slide movable past said recess in the frame and a light trap contained within the recess in the frame and comprising a strip of relatively soft fabric having a coating of stiffening material applied directly to its rear face and incorporated with such fabric to unite the fabric and the coating as a single part, said strip having one of its longitudinal edges secured to one of the walls of said recess in the frame, and a spring located in the bottom of said recess and having a plurality of longitudinally directed tongues bearing upon the stiffening coating on the strip and pressing the latter uniformly throughout its length against the exposure-controlling slide.

3. In a holder for sensitized photographic materials, the combination of a frame, a slide operative therein, and a light trap contained in said frame comprising a flexible light excluding strip adapted to coöperate with the slide, and a spring seated in the frame behind the light excluding strip for pressing the latter uniformly against the slide, said spring having its ends arranged to bear against the strip and also having longitudinally directed tongues struck from its intermediate portion and arranged to bear against the light excluding strip.

4. In a holder for sensitized photographic materials, the combination of a frame having a recess therein, a slide movable past said recess in the frame, and a light trap contained in said recess in the frame and comprising a strip of relatively soft flexible material adapted to coöperate with the slide, and a spring seated in the bottom of said recess in the frame behind said strip, the spring embodying a length of flat resilient material having its ends bent and extended longitudinally in opposite directions to bear upon the strip at or adjacent to the ends of the strip and also having a plurality of longitudinally directed tongues struck from its intermediate portion, said tongues being adapted to bear upon the intermediate portions of the strip.

5. In a holder for sensitized photographic materials, the combination of a frame, a slide operative therein, and a light trap contained in said frame comprising a strip of relatively soft flexible material having a stiffening coating applied to its rear face, and a spring seated in the frame behind said strip, the spring having its ends arranged to bear upon the strip at or adjacent to its ends and also having longitudinally directed tongues struck from its intermediate portion and adapted to bear against intermediate portions of the strip to press the same uniformly against the slide.

In testimony whereof I have hereunto set my hand in presence of two subscribing witnesses.

JOSEPH GODDARD.

Witnesses:
F. K. TOWNSEND,
NELLIE A. BRANNIGAN.